3,355,505
PROCESS FOR ISOMERIZING TERTIARY
VINYL CARBINOLS
Robert J. Tedeschi, Whitehouse Station, N.J., assignor to Air Reduction Company, Incorporated, New York, N.Y., a corporation of New York
Filed June 19, 1963, Ser. No. 292,188
7 Claims. (Cl. 260—642)

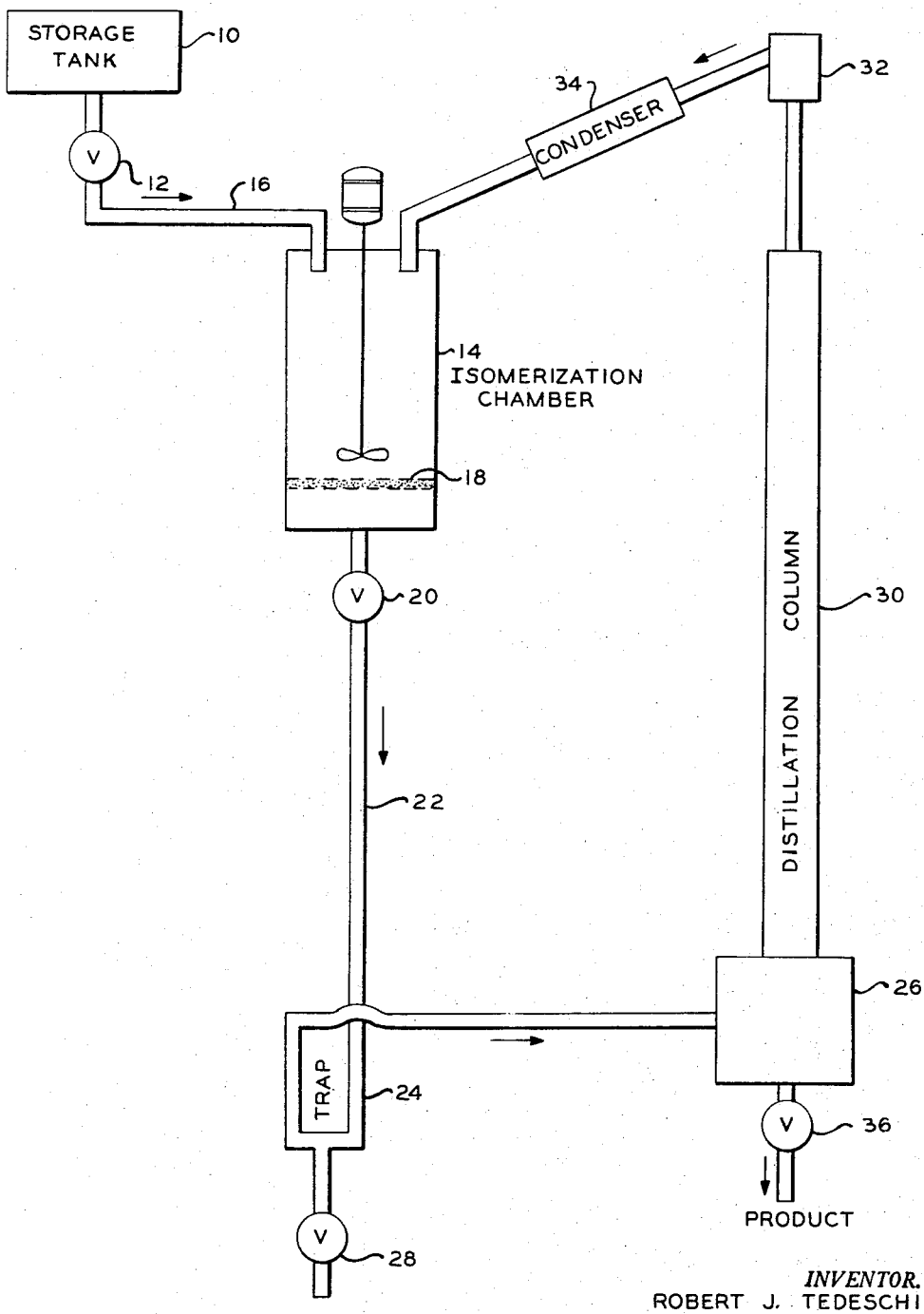

This is a continuation-in-part of my co-pending application Ser. No. 842,293, filed Sept. 25, 1959, and now abandoned.

This invention relates to a process for the rearrangement of tertiary vinyl carbinols. More particularly, this invention relates to a continuous process for the isomerization of tertiary vinyl carbinols to the corresponding allylic alcohols.

Attempts have been made to rearrange tertiary vinyl carbinols in a non-continuous batch-wise fashion with an acid catalyst; however, these attempts have resulted in very low conversions to the allylic alcohol isomers. The maximum conversion of tertiary vinyl carbinols to the allylic alcohol isomer obtained by the non-continuous batch process has been about 10 to 14%. The low conversions are primarily due to the numerous side reactions in which di-allylic ethers, mixed allylic and tertiary vinyl ethers and high boiling poly-condensation products are formed. It is virtually impossible to prevent substantial formation of these side reactions in a non-continuous batch process with the catalysts heretofore used for the isomerization of tertiary vinyl carbinols; therefore, the use of this non-continuous batch process and the use of known catalysts have been found to be impractical from a commercial standpoint.

It is an object of the present invention to provide an improved and economic process for the isomerization of tertiary vinyl carbinols.

It is a further object of the present invention to provide a substantially continuous process, including the use of a specific catalyst, for the isomerization of tertiary vinyl carbinols to obtain relatively high conversions to the allylic alcohol isomer.

Additional objects and advantages of this invention, if not specifically set forth, will become apparent to one skilled in the art during the course of the following description.

Generally, the present invention comprises a process for the rearrangement of tertiary vinyl carbinols to produce the allylic alcohol isomer in relatively high conversions. The tertiary vinyl carbinol to be rearranged is passed through an isomerization zone containing a specific solid catalyst. The unconverted tertiary vinyl carbinol is separated from the allylic alcohol isomer by distillation and the distillate is recirculated through the isomerization zone in a continuous process. The isomerization zone is heated to a temperature high enough to promote the isomerization of the tertiary vinyl carbinols but low enough to discourage the formation of the various by-products from the numerous side reactions. One of the factors directly affecting the ultimate percent conversion to the allylic isomer is the temperature of the isomerization zone. As the temperature increases, the formation of by-products increases, and the conversion to the allylic alcohol isomer necessarily decreases. The percent conversion to allylic alcohol is further dependent upon the length of time the tertiary vinyl carbinol remains in the isomerization zone. The rate at which the tertiary vinyl carbinol passes through the isomerization zone should be such that only a portion of the tertiary vinyl carbinol is isomerized to the allylic alcohol form. If the tertiary vinyl carbinol is allowed to remain in the isomerization zone for extended periods of time, the formation of by-products from the side reactions becomes appreciable. Therefore, the tertiary vinyl carbinol should be allowed to pass through the isomerization zone at a fairly rapid flow rate, even though the percent conversion to the allylic alcohol during each pass through the isomerization zone is small because the continuous recycling of the unisomerized material develops the high conversions. The utilization of high flow rates at temperatures which would normally lead to increased by-products at lower flow rates can be used to obtain higher productivity per unit time. The higher flow rate is important because this will insure a short catalyst contact time.

In order to effect a continuous process of the type contemplated herein the catalyst utilized should be insoluble in the reaction mixture and in a form such that it will not pass through the isomerization chamber. In order to prevent the passage of the catalyst from the isomerization chamber, a sintered glass plate may be placed at the base of the chamber. The catalyst is an acidic ion exchange resin which is insoluble in the reaction mixture, such as a sulfonated polystyrene resin, which is a preferred catalyst. The resin catalyst remains in the isomerization chamber, is not subject to decomposition and has a relatively long catalyst life. Since a conventional acid catalyst such as sulfuric acid, hydrochloric acid or phosphoric acid could not be retained in the isomerization chamber, it is apparent that such acids could not be utilized in the present invention. The use of these acids (sulfuric, hydrochloric and phosphoric) as catalysts in the typical noncontinuous batch process produces low yields of allylic alcohol. Thus, it is important in the present process to utilize as catalyst an acidic ion exchange resin as specified. The use of this catalyst is an important factor in achieving the high conversions which are realized.

After passing through the isomerization zone containing the catalyst bed, the mixture of allylic alcohol, unconverted tertiary vinyl carbinol and minor amounts of higher boiling by-products are continuously passed to a distillation assembly such as a center feed fractionating column, whereby the unconverted tertiary vinyl carbinol, due to its lower boiling temperature, is taken off the top of the column and recycled through the isomerization zone, while the allylic alcohol and by-products are collected near the bottom of the column. Subsequent distillation of the assembly bottoms produces a pure allylic alcohol isomer. Alternatively, the distillation assembly can be adjusted so that the allylic alcohol and by-products are allowed to collect in distillation pot which is so heated that only the unconverted tertiary vinyl carbinol is fractionated back to the isomerization zone.

The tertiary vinyl carbinols which can be isomerized in accordance with the present process may be represented by the following general formula:

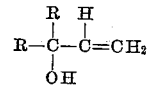

where R represents an alkyl radical, particularly a lower alkyl radical. Examples of some of the tertiary vinyl carbinols which can be utilized in the present process are 3-methyl-1-butene-3-ol; 3-methyl-1-pentene-3-ol; and 3,5-dimethyl-1-hexene-3-ol. The allylic alcohol formed by the present isomerization process may be represented by the general formula:

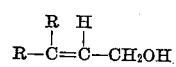

where R represents an alkyl radical, e.g. a lower alkyl radical. Thus, the isomerization results in the shifting of the OH group from position 3 to position 1, a shifting from a tertiary alcohol to a primary alcohol. Further the double bond shifts from the No. 1 position to the No. 2 position. The allylic form of these alcohols is generally more valuable than the vinyl form with some of the higher molecular weight allylic alcohols finding use in the perfume industry. Examples of some of the rearrangements which can be obtained with the present isomerization process are 3-methyl-1-butene-3-ol to 3-methyl-2-butene-1-ol; 3-methyl-1-pentene-3-ol to 3-methyl-2-pentene-1-ol and 3,5-dimethyl-1-hexene-3-ol to 3,5-dimethyl-2-hexene-1-ol.

A more complete understanding of the present invention may be obtained from the following description of the drawing.

In the drawing:

FIG. 1 is a diagrammatic flow sheet illustrating one embodiment of the present invention.

The tertiary vinyl carbinol to be isomerized is placed in storage vessel 10. A valve 12 controls the amount of fresh tertiary vinyl carbinol which enters the isomerization chamber 14 by means of line 16. Isomerization chamber 14 may be any type of reactor which has a means for heating and also preferably a means for agitating. At the base of the chamber is placed a sintered glass plate 18 which retains the catalyst in the isomerization chamber and allows the tertiary vinyl carbinol and allylic alcohol to pass through. The catalyst is an acidic ion exchange resin, as mentioned, but is preferably a sulfonated polystyrene resin which has been cross-linked with divinyl benzene such as the product sold under the tradename "Dowex 50." It is possible to utilize the "Dowex 50" (acid form) catalyst in the dry state; however, we have found unexpectedly superior results are generally obtained by using the catalyst in the form of a wet paste containing about 90% water. Also, we have found that "Dowex 50" having a mesh of from 50 to 100 produces good results. The use of lower mesh material or dry resins generally results in a slower rate of isomerization and lower conversions to the allylic isomer. "Dowex 50" resin is an ideal catalyst for the present isomerization since it is insoluble and is relatively stable up to a temperature of 100° C. The catalyst is placed in the bottom of the isomerization chamber just above the sintered glass plate 18. An agitator may be utilized to stir the catalyst bed and to obtain more efficient contact between the tertiary vinyl carbinol and the catalyst. Further, the agitator provides a means for more accurately controlling the temperature in the isomerization chamber. The temperature of the isomerization chamber should not be greater than about 80° C. and preferably should be maintained between about 40 to 70° C. At temperatures above 80° C., the tertiary vinyl carbinol and the allylic alcohol formed are rapidly dehydrated to isoprene. Thus, in order to obtain optimum conversion to the allylic isomer, the temperature of the isomerization chamber should not be allowed to rise above about 80° C. The temperature utilized is dependent upon the rate of flow through the isomerization chamber, and a faster flow rate will enable use of a higher temperature.

In initiating the reaction, valve 20, located below the isomerization chamber is placed in the closed position. The catalyst is placed in the base of the chamber, tertiary vinyl carbinol is allowed to pass from storage vessel 10 through line 16 into isomerization chamber 14 until the isomerization chamber is filled to about one-third to one-half capacity. The agitator is then started and the isomerization chamber brought up to the isomerization temperature. When the desired temperature is reached, valve 20 is opened to allow a portion of the partially isomerized tertiary vinyl carbinol to pass out of the isomerization chamber. The partially isomerized tertiary vinyl carbinol passes through line 22 into a simple azeotrope-water trap 24 which prevents excess by-product water from entering still pot 26. A valve 28 is supplied at the base of the azeotrope-water trap to allow the water collected to be drained off. After passing through the azeotrope-water trap, the partially isomerized tertiary vinyl carbinol enters distillation pot 26. The temperature of this pot is maintained at a temperature just above the boiling point of the lower boiling tertiary vinyl carbinol and below the boiling point of the allylic isomer. Thus, the tertiary vinyl carbinol boils and passes out of the distillation pot up through a typical heated column 30 into a distilling head 32, through a condenser 34 and back into the isomerization chamber 14. Condenser 34 should be designed so that the temperature of the tertiary vinyl carbinol which enters isomerization chamber 14 is below the isomerization temperature and preferably between about 20 to 40° C. In this manner the isomerized tertiary vinyl carbinol is continuously recycled through the isomerization chamber while the allylic alcohol isomer remains in the distillation pot and may be drained therefrom by opening a valve 36 located in the base of the pot. The allylic alcohol which is taken from the distillation pot may be purified by any convenient method such as fractional distillation.

The amount of fresh tertiary vinyl carbinol which is added to the isomerization chamber from vessel 10 will depend upon the amount of tertiary vinyl carbinol which is recycled from distillation pot 26. An amount of fresh tertiary vinyl carbinol should be added to the isomerization chamber to maintain the level of tertiary vinyl carbinol in the isomerization chamber from about one-third to one-half capacity. The rate of flow through the isomerization chamber may be controlled by controlling the rate of distillation and by means of the various valves. The flow rate will be varied with the type of equipment, temperature of the isomerization chamber, the amount of agitation, etc., but the flow rate and temperature should be controlled in order to prevent the formation of deleterious by-products which may be easily formed in this reaction.

By utilizing the present isomerization process it is possible to obtain a conversion from tertiary vinyl carbinol to the allylic alcohol isomer of about 60%. The high conversion rate is believed to be due to the careful control of the temperature and the continuous rapid flow of the tertiary vinyl carbinol through the isomerization chamber, in the presence of the acidic ion exchange resin catalyst. The rapid flow through the catalyst bed insures a short catalyst contact time hence minimizing the likelihood of the formation of by-products. As can be seen, the present process represents a decided improvement over the older non-continuous batch process wherein conversions were in the order of 10 to 14%.

*Example I*

430 grams of 3-methyl-1-butene-3-ol were placed in a reaction vessel which contains 55 grams of "Dowex 50" (X–1 acid form) 50–100 mesh resin as a wet paste containing about 90% water as a catalyst. The mixture was heated to a temperature of about 50° C. for 24 hours with stirring. Upon fractional distillation 60.2 grams of 3-methyl-2-butene-1-ol were isolated representing a conversion to the allylic alcohol of about 14%. The major by-products were ethers and high boiling oils with the amount of isoprene formed at a minimum, presumably due to the low reaction temperature utilized.

*Example II*

430 grams (5 moles) of 3-methyl-1-butene-3-ol were placed in a one-liter distillation pot and 10 grams of $Na_2CO_3$ were added to the pot. The $Na_2CO_3$ was used to neutralize any sulfuric acid which may be formed from hydrolysis of the "Dowex 50" and which passes through the isomerization chamber and into the distillation pot. The presence of acid in the distillation pot would tend to dehydrate the 3-methyl-1-butene-3-ol to isoprene and lead to the formation of higher boiling by-products at the temperature of the pot. The distillation pot was maintained at a temperature of from about 94 to 148° C. and the 3- methyl-1-butene-3-ol boiled vigorously up through a heated column (40 inches by 1 inch) which was filled with Podbelniak packing (HTP=1 inch) to a height of 20 inches. At the top of the column was placed a standard distilling head equipped with an inner drip condenser through which the 3-methyl-1-butene-3-ol passed. After the distilling head, an inner coiled condenser (7 inches by 2 inches) was provided to further cool the distillate to about 20–30% C. From the condenser the 3-methyl-1-butene-3-ol passed into an isomerization chamber (7 inches by 3 inches) which consisted of a modified, fritted, course filter funnel equipped with a wide joint top, thermocouple and charging ports. The chamber was heated with an electrical tape to a temperature of from 35 to 85° C. A valve at the base of the chamber was placed in a closed position until the distillate filled the chamber to from about one-third to one-half capacity. When the chamber was so filled, the valve at the base of the chamber was opened to allow passage of the partially isomerized methyl butenol to pass out with the valve being controlled so that the chamber remained partially filled. The isomerization chamber contained 55 grams of "Dowex 50" (X–1 acid form) resin catalyst of 50–100 mesh as a wet paste containing 90% water. The catalyst was placed above the sintered glass plate which prevented its passing out of the chamber. As the distillation continued a portion of the methyl butenol passed through the catalyst bed of the isomerization chamber and became partially isomerized to 3-methyl-2-butene-1-ol. This partially isomerized material was continuously removed from the chamber and passed through a straight tube which was long enough to provide a sufficient head pressure to insure a continuous feed rate of partially isomerized material to the distillation pot. At the base of the tube was placed a simple azeotrope-water trap which prevented excess by-product water from returning to the distillation pot. The 3-methyl-2-butene-1-ol which had been formed remained in the base of the distillation pot as the temperature of the pot was maintained below the boiling point of the isomer; however, since the temperature of the pot was above the boiling point of the 3-methyl-1-butene-1-ol, this material rose through the column and hence back to the isomerization chamber. Thus, the desired isomer 3-methyl-2-butene-1-ol remained in the distillation pot while the 3-methyl-1-butene-3-ol was continually recycled to be further isomerized. The flow through the isomerization chamber was maintained at a rapid rate not less than about 3 cc. per minute by controlling the temperature of the distillation pot and the position of the various valves. The isomerization was continued for 9 hours during which the temperature of the distillation pot was observed to drop from 96° to 80° C. during the first hour, probably due to the formation of the methyl butenol-water azeotrope. After about 5 hours the reaction temperature climbed to about 110 to 125° C. and later rose to 140° C. Subsequent to the reaction the apparatus was flushed with 300 cc. of hexane for about 30 minutes to wash the "Dowex 50" catalyst. It was noted that the catalyst was sufficiently active, after the above reaction, to be utilized in further reactions. The isomerization mixture was then distilled at atmospheric pressure to remove the solvent and low boilers and finally under diminished pressure to separate the 3-methyl-2-butene-1-ol. 165.1 grams of 3-methyl-2-butene-1-ol were isolated representing a conversion from the starting 3-methyl-1-butene-3-ol to the 3-methyl-2-butene-1-ol isomer of 38.4%.

*Example III*

Five moles of 3-methyl-1-butene-3-ol were isomerized in the same manner as described in Example II except that the isomerization temperature was maintained between 50–60° C., and the reaction time was 16½ hours. 181.46 grams of 3-methyl-2-butene-1-ol isomer were prepared representing a conversion of 42.2%.

*Example IV*

Five moles of 3-methyl-1-butene-3-ol were isomerized in the same manner as described in Example II except that the isomerization chamber was maintained at a temperature of 60–70° C., and the reaction time was 16 hours. 253.7 grams of 3-methyl-2-butene-1-ol isomer were prepared representing a conversion of 59%.

*Example V*

Five moles of 3-methyl-1-butene-3-ol were isomerized by the method described in Example II except that the temperature of the isomerization chamber was maintained between 50 and 60° C., the reaction time was 24 hours, and the isomerization chamber was provided with an agitator to stir the catalyst bed. 219.3 grams of the 3-methyl-2-butene-1-ol isomer were prepared representing a conversion of 51%.

*Example VI*

Five moles of 3-methyl-1-butene-3-ol were isomerized by the method described in Example V except that the temperature of the isomerization chamber was maintained between 50 and 52° C., and the reaction time was 10 hours. 232.2 grams of 3-methyl-2-butene-1-ol isomer were prepared representing a conversion of 54%.

*Example VII*

Five moles of 3-methyl-1-butene-3-ol were isomerized by the method as described in Example V except 5 grams of "Dowex 50" (X–1 acid form) 50–100 mesh were employed as a catalyst in the dry state. 189.2 grams of the 3-methyl-2-butene-1-ol isomer were prepared representing a conversion of 44.2%.

The lower conversion of Examples II and III were due to substantial variations in the flow rate through the catalyst bed and to leakage at various joints. The lower conversion of Example VII was due to the utilization of a dry catalyst instead of the wet paste utilized in Examples II through VI. From Example VI it can be seen that generally good conversion may be obtained in a short reaction time where a stirred catalyst bed was utilized.

The following examples for the preparation of 3-methyl-2-pentene-1-ol and 3,5-dimethyl-1-hexene-3-ol indicate that the conversions of the higher molecular weight compounds are slightly lower than the conversion of methyl butenol.

*Example VIII*

Five moles (500 grams) of 3-methyl-1-pentene-3-ol were isomerized in the same manner as described in Example V except that the temperature of the isomerization chamber was maintained between 25 and 40° C. and the reaction time was 26 hours. 172 grams of 3-methyl-2-pentene-1-ol were prepared representing a conversion of 34.4%.

*Example IX*

Five moles of 3-methyl-1-pentene-3-ol were isomerized in the same manner as described in Example VII except that the temperature of the isomerization chamber was maintained between 30 and 40° C., and no stirring was provided in the isomerization chamber. 123 grams of 3-methyl-2-pentene-1-ol were prepared representing a conversion of 24.6%.

*Example X*

Five moles of 3-methyl-1-pentene-3-ol were isomerized by the method described in Example IX except that 10 grams of "Dowex 50" (X–4 acid form) 20–50 mesh was used as a catalyst in a dry form, the temperature of the isomerization chamber was 55–70° C., and the reaction time was 23 hours. 102 grams of 3-methyl-2-pentene-1-ol were prepared representing a conversion of 20.4%.

In comparing the conversion of Examples VIII, IX and X it can be seen that maximum conversion to the allylic isomer is obtained when the catalyst bed is stirred and where the catalyst is utilized in the form of a wet paste. The lower conversion of Example IX was due to the fact that the isomerization chamber was operated without stirring and the lower conversion of Example X because the catalyst was used in the dry form rather than the wet paste. The same is true for the following examples showing the preparation of 3,5-dimethyl-2-hexene-1-ol.

*Example XI*

640 grams (5 moles) of 3,5-dimethyl-1-hexene-3-ol were isomerized by the method described in Example VII except 64 grams "Dowex 50" (X-1 acid form) in the dry state was used as a catalyst, the temperature of the isomerization chamber was maintained between 35 and 40° C., a reaction time of 24 hours at a diminished pressure of 100 mm. were utilized. 249.6 grams of 3,5-dimethyl-2-hexene-1-ol were prepared representing a conversion of 39%.

*Example XII*

640 grams of 3,5-dimethyl-1-hexene-3-ol were isomerized in the same manner as described in Example XI except that the catalyst used was 55 grams "Dowex 50" as a wet paste containing 90% water. 294.4 grams of 3,5-dimethyl-2-hexene-1-ol were prepared representing a conversion of 46%.

*Example XIII*

Seven moles of 3-methyl-1-butene-3-ol were isomerized in the manner described in Example II except that the isomerization temperature was maintained between 51–54° C. and the reaction time was approximately 11 hours. The 3-methyl-2-butene-1-ol recovered represented a conversion of 51.5%.

As previously indicated, unexpectedly improved results are obtained when water is present with the acidic ion exchange resin in the isomerization chamber. In comparative tests in the isomerization of 3-methyl-1-butene-3-ol, using a catalyst containing about 90% water, at least some of the water removed as azeotrope from the distillation column was re-cycled to the isomerization chamber in one experiment, whereas the water was completely separated from the distillate in the other experiment before returning the distillate to the isomerization chamber. In the second experiment the conversion of isomerized product fell to about one-fourth the conversion obtained in the first experiment in which the water was returned to the isomerization zone. I thus find it advantageous to have water present in the isomerization zone at all times, although the amount of water can vary greatly and does not have to be kept within any definite limits. Since some water may be formed by dehydration reactions, there will tend to be an increase in the amount of water in the system and this increase, if it becomes excessive may tend to cause foaming in the isomerization zone. If this should occur then, of course, this excess water should be removed from the condensate, e.g. by means of a conventional water decanter.

While a typical system for carrying out the process of this invention has been described above and illustrated in the drawing, it will be understood that the invention is not limited to this specific system and that other continuous systems may be employed. For example, instead of having a reaction chamber in which the acidic ion exchange resin catalyst is continuously stirred, the catalyst may be kept in a fluidized condition by upward movement of the reactants through it, e.g., under positive pumping pressure. In such a system, for example, the storage tank 10 and the condenser 34 would be connected to empty into a storage vessel from which the condensate and/or fresh tertiary vinyl carbinol would be pumped upwardly through the reaction chambers, and the effluent from the top of the reaction chamber would pass into line 22, which would be connected to the top of the chamber, instead of to the bottom of the chamber as it is in the system shown in the drawing. In the case of such a fluidized system, the inflowing material would be pumped at a rate sufficient to maintain the catalyst in fluidized condition, and the top of the reaction chamber would be provided with a sieve, e.g. a sintered glass plate like the sintered glass plate 18 in the bottom of the chamber, to prevent loss of catalyst with the fluid stream. Other systems for carrying out the continuous isomerization of this invention will be readily apparent to those skilled in the art.

Obviously many modifications and modifications of the invention as hereinbefore set forth may be made without departing from the spirit and scope thereof, and therefore, only such limitations should be imposed as are indicated in the appended claims.

I claim:
1. A process for the isomerization to a primary allylic alcohol of a tertiary vinyl carbinol having only vinyl unsaturation and having the formula

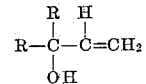

and said primary allylic alcohol having the formula

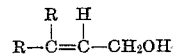

wherein R represents an alkyl radical, which comprises continuously introducing said tertiary vinyl carbinol into an isomerization zone containing a moist sulfonated polystyrene ion exchange resin catalyst cross-linked with divinyl benzene, said moist catalyst containing at least about 90% water, having a mesh size of about 50 to 100, and being continuously agitated, heating said tertiary vinyl carbinol in the liquid phase in said isomerization zone in the presence of said catalyst at a temperature in the range of 40° C. to 70° C., continuously withdrawing a reaction mixture containing a primary allylic alcohol, unreacted tertiary vinyl carbinol, and water from said isomerization zone, distilling said reaction mixture to obtain a distillate of tertiary vinyl carbinol and water and a residue containing primary allylic alcohol, continuously recycling said tertiary vinyl carbinol and at least some of said water to said isomerization zone, whereby to maintain water continuously present in said isomerization zone and to maintain said ion exchange resin continuously moist, and recovering the primary allylic alcohol from said residue.

2. A process according to claim 1, wherein the tertiary vinyl carbinol is 3-methyl-1-butene-3-ol, and the primary allylic alcohol is 3-methyl-2-butene-1-ol.

3. A process according to claim 1, wherein the tertiary vinyl carbinol is 3-methyl-1-pentene-3-ol and the primary allylic alcohol is 3-methyl-2-pentene-1-ol.

4. A process according to claim 1, wherein the tertiary vinyl carbinol is 3,5-dimethyl-1-hexene-3-ol and the primary allylic alcohol is 3,5-dimethyl-2-hexene-1-ol.

5. A process for the isomerization of 3-methyl-1-butene-3-ol to 3-methyl-2-butene-1-ol which comprises continuously introducing 3-methyl-1-butene-3-ol into an isomerization zone containing a catalyst consisting of a moist sulfonated polystyrene ion exchange resin cross-linked with divinyl benzene, heating said 3-methyl-1-butene-3-ol in the liquid phase in said isomerization zone at a temperature in the range of about 60° C. to 70° C., continuously withdrawing a reaction mixture containing 3-methyl-2-butene-1-ol and unreacted 3-methyl-1-butene-3-ol from said isomerization zone, distilling said reaction mixture to obtain a distillate of 3-methyl-1-butene-3-ol and a residue containing 3-methyl-2-butene-1-ol, continuously recycling said distillate to said isomerization zone while maintaining said ion exchange resin continuously moist by introducing water into said isomerization zone during said continuous recycling, and recovering 3-methyl-2-butene-1-ol from said residue.

6. A process for the isomerization of 3-methyl-1-pentene-3-ol to 3-methyl-2-pentene-1-ol which comprises continuously introducing 3-methyl-1-pentene-3-ol into an isomerization zone containing a catalyst consisting of a moist sulfonated polystyrene ion exchange resin cross-linked with a divinyl benzene, heating said 3-methyl-1-pentene-3-ol in the liquid phase in said isomerization zone at a temperature in the range of 40° C. to 70° C., continuously withdrawing a reaction mixture containing 3-methyl-2-pentene-1-ol and unreacted 3-methyl-1-pentene-3-ol from said isomerization zone, distilling said reaction mixture to obtain a distillate of 3-methyl-1-pentene-3-ol and a residue containing 3-methyl-2-pentene-1-ol, continuously recycling said distillate to said isomerization zone while maintaining said ion exchange resin continuously moist by introducing water into said isomerization zone during said continuous recycling, and recovering 3-methyl-2-pentene-1-ol from said residue.

7. A process for the isomerization of 3,5-dimethyl-1-hexene-3-ol to 3,5-dimethyl-2-hexene-1-ol which comprises continuously introducing 3,5-dimethyl-1-hexene-3-ol into an isomerization zone containing a catalyst consisting of a moist sulfonated polystyrene ion exchange resin cross-linked with divinyl benzene, heating said 3,5-dimethyl-1-hexene-3-ol in the liquid phase in said isomerization zone at the temperature in the range of 40° C. to 70° C., continuously withdrawing a reaction mixture containing 3,5-dimethyl-2-hexene-1-ol and unreacted 3,5-dimethyl-1-hexene-3-ol from said isomerization zone, distilling said reaction mixture to obtain a distillate of 3,5-dimethyl-1-hexene-3-ol and a residue containing 3,5-dimethyl-2-hexene-1-ol, continuously recycling said distillate to said isomerization zone while maintaining said ion exchange resin continuously moist by introducing water into said isomerization zone during said continuous recycling, and recovering 3,5-dimethyl-2-hexene-1-ol from said residue.

References Cited
UNITED STATES PATENTS 2,435,078   1/1948   Hearne et al. _____ 260—642

OTHER REFERENCES

Heilbron et al.: J. Chem. Soc., p. 144 (1944).

Kresson: Manufacturing Chemist, pp. 457–8 (November 1956).

Nachod: Ion Exchange (1949), pp. 265–272.

Nazarov et al.: Jr. Gen. Chem. U.S.S.R. English translation vol. 20 (1950), pp. 1149–1155.

Sussman: Industrial and Eng. Chem., vol. 38, pp. 1228–30 (1946).

LEON ZITVER, *Primary Examiner.*

M. B. ROBERTO, J. E. EVANS, *Assistant Examiner.*

UNITED STATES PATENT OFFICE
CERTIFICATE OF CORRECTION

Patent No. 3,355,505                      November 28, 1967

Robert J. Tedeschi

It is hereby certified that error appears in the above numbered patent requiring correction and that the said Letters Patent should read as corrected below.

Column 3, line 38, for "shower" read -- slower --; column 5, line 9, for "30%" read -- 30° --; line 41, for "3-methyl-1-butene-1-ol" read -- 3-methyl-1-butene-3-ol --; column 6, line 34, for "conversion" read -- conversions --; column 7, line 72, for "chambers" read -- chamber --; column 8, line 1, for "drawing," read -- drawing. --.

Signed and sealed this 10th day of June 1969.

(SEAL)

Attest:

Edward M. Fletcher, Jr.

Attesting Officer

WILLIAM E. SCHUYLER, JR.

Commissioner of Patents